United States Patent
Ha (10) Patent No.: US 8,253,738 B2
(45) Date of Patent: Aug. 28, 2012

(54) DATA PROCESSING APPARATUS AND METHOD

(75) Inventor: In Woo Ha, Seongnam-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 748 days.

(21) Appl. No.: 12/382,750

(22) Filed: Mar. 23, 2009

(65) Prior Publication Data

US 2010/0091019 A1 Apr. 15, 2010

(30) Foreign Application Priority Data

Oct. 15, 2008 (KR) .................. 10-2008-0101171

(51) Int. Cl.
*G06T 15/00* (2011.01)
(52) U.S. Cl. ......... 345/426; 345/505; 345/623; 345/629
(58) Field of Classification Search .................. 345/426, 345/505, 623, 629
See application file for complete search history.

(56) References Cited

U.S. PATENT DOCUMENTS

| 7,952,583 B2 * | 5/2011 | Waechter et al. ............. 345/426 |
| 8,065,288 B1 * | 11/2011 | Garland et al. ................ 707/706 |
| 8,072,460 B2 * | 12/2011 | Lauterbach et al. ........... 345/505 |

FOREIGN PATENT DOCUMENTS

| KR | 10-2008-0018501 | 2/2008 |
| KR | 10-2008-0020198 | 3/2008 |
| KR | 10-2008-0052328 | 6/2008 |
| KR | 10-2008-0055327 | 6/2008 |

* cited by examiner

*Primary Examiner* — Phu K Nguyen
(74) *Attorney, Agent, or Firm* — Staas & Halsey LLP

(57) ABSTRACT

A data processing apparatus for a collision check with respect to a plurality of rays. A control unit may generate a plurality of packets with respect to a plurality of rays associated with a first node in a spatial data structure. At least one of the plurality of packets may include information about k rays, and k may be a natural number. A processor may sequentially receive the plurality of packets and determine which child node of the first node is associated with each of the plurality of rays associated with the first node.

20 Claims, 6 Drawing Sheets

DATA PROCESSING APPARATUS AND METHOD

CROSS-REFERENCE TO RELATED APPLICATIONS

This application claims the benefit of Korean Patent Application No. 10-2008-0101171, filed on Oct. 15, 2008, in the Korean Intellectual Property Office, the disclosure of which is incorporated herein by reference.

BACKGROUND

1. Field

Example embodiments relate to a data processing apparatus and method for a collision check which may be used for three-dimensional (3D) rendering, ray tracing, and the like.

2. Description of the Related Art

Much research has been actively conducted in using a Single Instruction Multiple Data (SIMD) technology of hardware to accelerate ray tracing. The computational complexity of ray tracing may be associated with a multiplication of the number of rays and the number of geometries. A computational speed may be improved by an SIMD operation.

Currently, an SIMD bandwidth of up to 128 bits has been developed. An SIMD bandwidth is expected to be developed up to 512 bits in 2010 according to a road map of hardware manufacturing companies such as Intel, nVidia, etc.

Along with the development of hardware, it has become more significant to research for a technology to simultaneously perform a collision check with respect to rays with a high coherency. Specifically, the rays with a high coherency may have similar starting points, destinations, and directions.

However, SIMD acceleration algorithms in the conventional art are simply based on primary rays. In ray tracing, although a primary ray shows a high coherency, coherency of rays after a secondary ray rapidly deteriorates.

Also, ray tracing may be an algorithm suitable for branching/recursion which is a characteristic of a Central Processing Unit (CPU). A processor with a high Floating-point Operation (FLOP) count such as a Graphics Processing Unit (GPU), a Cell, etc., generally uses a streaming algorithm, and thus such feature is required to be taken into account in ray tracing.

SUMMARY

Example embodiments may provide a Single Instruction Multiple Data (SIMD) acceleration method and operation apparatus which utilizes a secondary ray as well as a primary ray.

Example embodiments may also provide a data processing method and apparatus which prevents an SIMD operation from being affected by coherency of rays to achieve an improvement of performance in proportion to an increase in a number of SIMD bits.

According to example embodiments, there may be provided a data processing apparatus for a collision check with respect to a plurality of rays, the data processing apparatus including a control unit to generate a plurality of packets with respect to a plurality of rays associated with a first node in a spatial data structure, at least one of the plurality of packets including information about k rays, k being a natural number, and a processor to receive the plurality of packets and determine which child node of the first node is associated with each of the plurality of rays associated with the first node.

The processor may be a Single Instruction Multiple Data (SIMD)-type processor.

When it is determined which child node of the first node is associated with each of the plurality of rays associated with the first node, the processor may determine which child node of a second node is associated with each of a plurality of rays associated with the second node according to a breadth-first search algorithm. The second node may have a same depth as the first node in the spatial data structure.

When it is determined which child node of the first node is associated with each of the plurality of rays associated with the first node, the processor may determine which grandchild node of the first node is associated with each of a plurality of rays associated with a first child node of the first node according to a depth-first search algorithm.

The spatial data structure may be a kd-tree or a Bounding Volume Hierarchies (BVH). In this instance, a number of the child nodes of the first node may be two.

The processor may be a 128 bit processor, and k may be four.

According to example embodiments, there may be provided a data processing apparatus for a collision check with respect to a plurality of rays, the data processing apparatus including a control unit to generate a plurality of packets with respect to a plurality of rays associated with a first node in a spatial data structure, at least one of the plurality of packets including information about k rays, k being a natural number, a first buffer memory to temporarily store the plurality of packets provided from the control unit, and a processor to receive the plurality of packets from the first buffer memory and determine which child node of the first node is associated with the plurality of rays associated with the first node.

The data processing apparatus may further include a second buffer memory to store ray data including information about which child node of the first node is associated with the plurality of rays associated with the first node.

The processor may sequentially receive the plurality of packets from the first buffer memory and determine which child node of the first node is associated with k rays of the plurality of rays associated with the first node at every operation based on an SIMD operation.

According to other example embodiments, there may be provided a data processing method for a collision check with respect to a plurality of rays, the data processing method including generating a plurality of packets with respect to a plurality of rays associated with a first node in a spatial data structure, at least one of the plurality of packets including information about k rays, k being a natural number, and providing the plurality of packets to a processor and determining which child node of the first node is associated with each of the plurality of rays associated with the first node.

After it is determined which child node of the first node is associated with each of the plurality of rays associated with the first node in the spatial data structure, the data processing method may determine which child node of a second node is associated with each of a plurality of rays associated with the second node according to a breadth-first search algorithm. The second node may have a same depth as the first node in the spatial data structure.

After it is determined which child node of the first node is associated with each of the plurality of rays associated with the first node in the spatial data structure, the data processing method may determine which grandchild node of the first node is associated with each of a plurality of rays associated with a first child node of the first node according to a depth-first search algorithm.

According to other example embodiments, there may be provided a data processing method for a collision check with respect to a plurality of rays, the data processing method including generating a plurality of packets with respect to a plurality of rays associated with a first node in a spatial data structure and storing the plurality of packets in a first buffer memory, at least one of the plurality of packets including information about k rays, k being a natural number, extracting the plurality of packets from the first buffer memory and providing the plurality of packets to an SIMD-type processor to determine which child node of the first node is associated with the plurality of rays associated with the first node, and storing ray data in a second buffer memory, the ray data including information provided from the SIMD-type processor.

The spatial data structure may be a kd-tree, and a number of the child nodes may be two.

The spatial data structure may be a Bounding Volume Hierarchies (BVH), and a number of the child nodes of the first node may be two.

Additional aspects and/or advantages will be set forth in part in the description which follows and, in part, will be apparent from the description, or may be learned by practice of the invention.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION

Reference will now be made in detail to example embodiments, examples of which are illustrated in the accompanying drawings, wherein like reference numerals refer to the like elements throughout. Example embodiments are described below to explain the present disclosure by referring to the figures.

Figure 1:
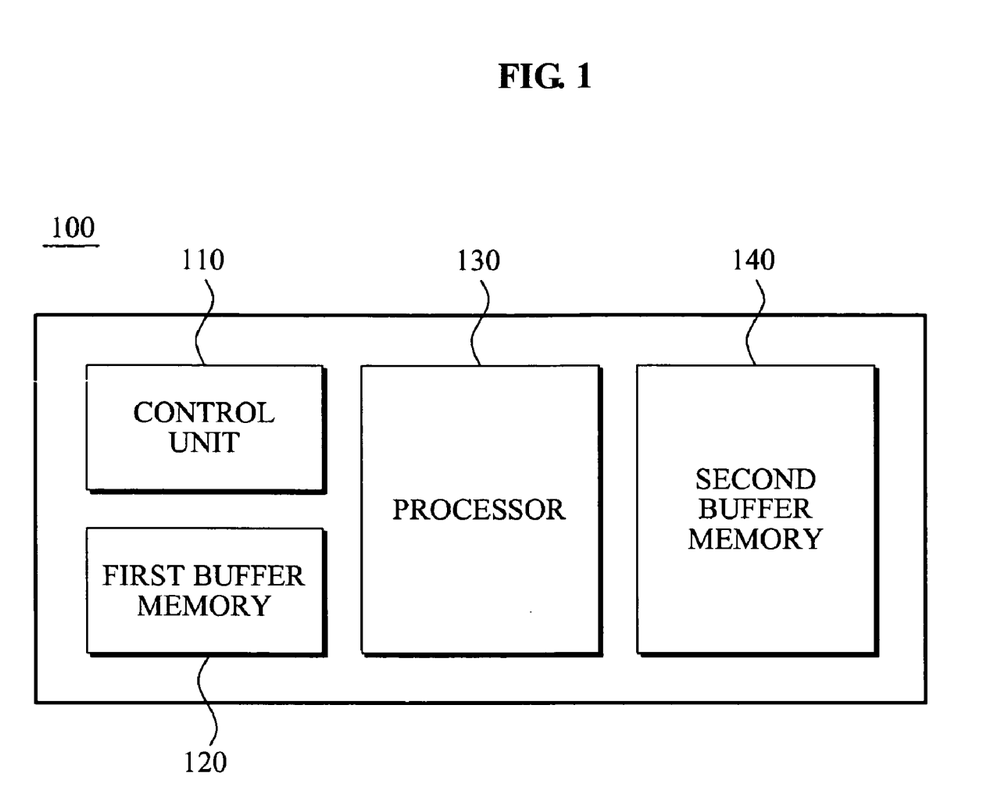
FIG. 1 illustrates a data processing apparatus according to example embodiments.

FIG. 1 illustrates a data processing apparatus 100 according to example embodiments.

A control unit 110 of the data processing apparatus 100 may generate a plurality of packets with respect to a plurality of received rays. All of the plurality of received rays may be associated with the same node in advance.

Each of the plurality of packets may include k rays. In this instance, k may be a natural number, and represent a number of pieces of data that may be processed by a processor 130 in parallel.

According to example embodiments, the data processing apparatus 100 may include a first buffer memory 120. The first buffer memory 120 may store the plurality of packets. Also, the plurality of packets may be sequentially provided by the control unit 110 to the processor 130.

In ray tracing, a tree traversal may be performed in a spatial data structure to determine which rays and geometric objects in a three-dimensional (3D) model intersect (or collide). In this instance, the spatial data structure may be associated with the 3D model.

Depending on example embodiments, the processor 130 may be a Single Instruction Multiple Data (SIMD)-type processor. Accordingly, a child node of k pieces of ray data, that is, a single packet, may be determined.

According to example embodiments, the plurality of rays whose child node is determined may be stored in a second buffer memory 140. Also, the plurality of rays may be divided into rays having a same child node and stored in the second buffer memory 140.

According to other example embodiments, the second buffer memory 140 may include at least two memory structures. Also, the rays having the same child node from among the plurality of rays whose child node is determined may be stored in a same memory structure.

Figure 2:
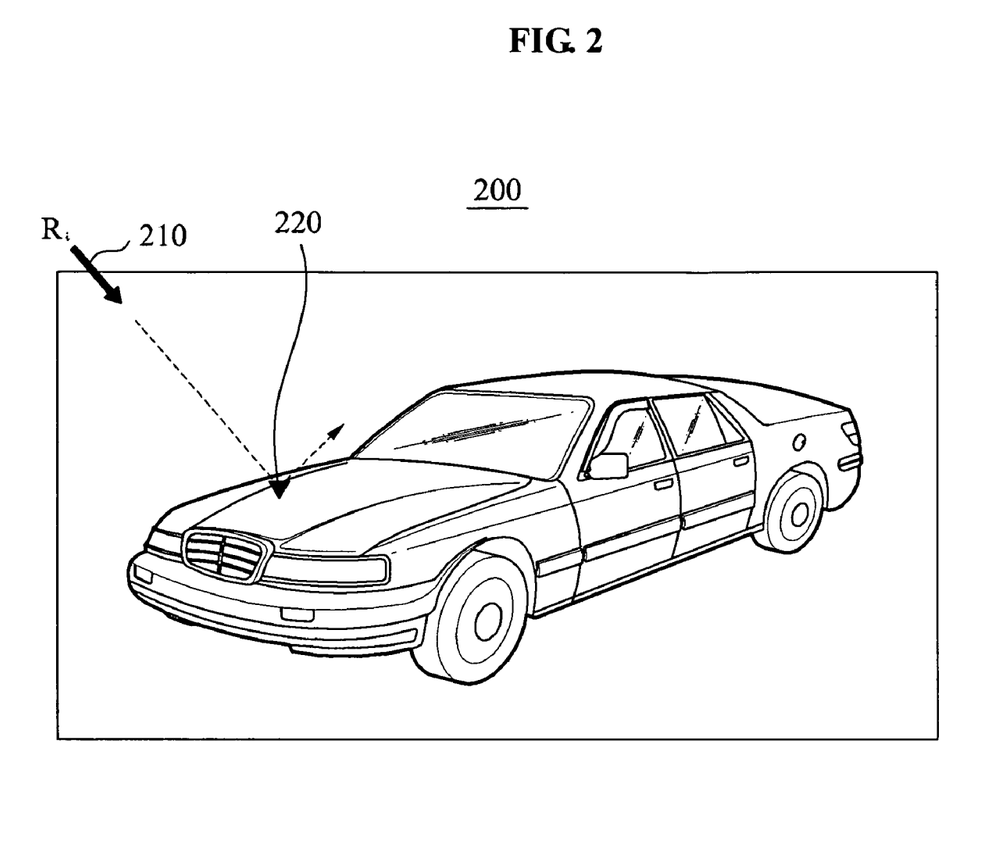
FIG. 2 illustrates an example of a collision check according to example embodiments.

FIG. 2 illustrates an example of a collision check according to example embodiments.

A 3D model 200 is rendered by a ray tracing method. The 3D model 200 may be a mesh-based 3D model, or a point-based 3D model.

The collision check may be performed with respect to a ray $R_i$ 210. In ray tracing, the collision check may be performed to determine a location where a particular ray collides in an object space of the 3D model 200. Also, a degree of reflection, a degree of transmission, and a degree of direct illumination of a light source at the collision location may be determined through the collision check.

According to example embodiments, a data processing apparatus and method may determine a geometric object 220 where a particular ray, for example, the ray $R_i$ 210, and the 3D model 200 collide. The geometric object 220 may be a unit structure for the 3D model 200. The geometric object 220 may be a polygon such as a triangle in the mesh-based 3D model, and a point in the point-based 3D model.

Figure 3:
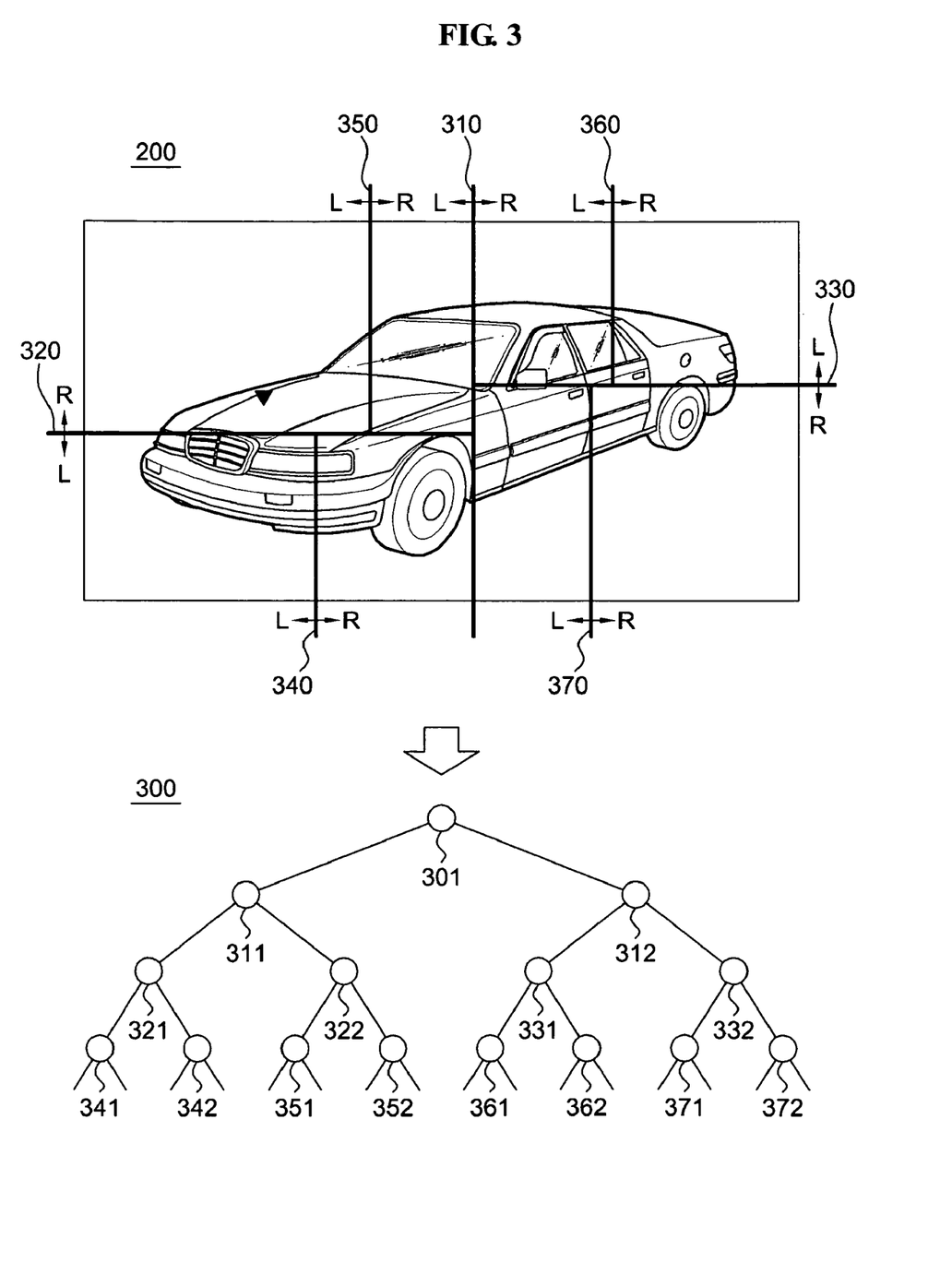
FIG. 3 illustrates a spatial data structure associated with a three-dimensional (3D) model, for example, a three-dimensional model of FIG. 2.

FIG. 3 illustrates a spatial data structure associated with a 3D model, for example, the 3D model 200 of FIG. 2.

While the 3D model 200 of FIG. 2 is repeatedly divided into two areas to determine the location where the ray $R_i$ 210 of FIG. 2 collides, an operation of determining which area of the divided two areas is associated with the ray $R_i$ 210 may be repeated.

According to example embodiments, a spatial data structure 300 may be a kd-tree.

According to other example embodiments, the spatial data structure 300 may be a Bounding Volume Hierarchies (BVH). In the BVH, the 3D model 200 may be divided into two bounding boxes by volume. However, every spatial data structure generated based on the kd-tree or BVH may be represented as the spatial data structure 300, that is, a tree structure.

Hereinafter, that the spatial data structure 300 is the kd-tree is described only as an example. However, the spatial data structure 300 may be kd-tree as well as the BVH. Accordingly, the spatial data structure 300 may not be limited to a particular spatial data structure, and those skilled in the art may appreciate that changes may be made.

The 3D model 200 may be divided into the two areas depending on a number of geometries of an object to generate the kd-tree.

Specifically, the 3D model 200 may be divided into a left area L and a right area R based on a boundary 310. According to example embodiments, a number of geometries included in the left area L is the same as a number of geometries included in the right area R. According to other example embodiments, however, changes may be made, for example, the 3D model 200 may be divided to enable each divided area to have equal spatial volume. In this instance, a generated spatial tree structure may be unbalanced.

Also, each of the left area L and the right area R, divided by the boundary 310, may be divided into two areas. The left area L of boundary 310 may be divided by a boundary 320, and the right area R of boundary 310 may be divided by a boundary 330. Accordingly, the 3D model 200 may be divided into four areas.

Similarly, each of the divided areas may be divided into two areas again, and thus the 3D model 200 may be divided into eight areas.

A node 301 of the spatial data structure 300 may be associated with the entire 3D model 200. The left area L, generated by dividing the 3D model 200 by the boundary 310, may be associated with a node 311. Also, the right area R, generated by dividing the 3D model 200 by the boundary 310, may be associated with a node 312.

The ray $R_i$ 210 of FIG. 2 may be associated with the node 311 since the ray $R_i$ 210 and the left area L, located on a left side based on the boundary 310, collide.

Also, the left area L may be divided into two areas by the boundary 320, and thereby may be associated with a node 321 and a node 322. Similarly, the right area R may be divided into two areas by the boundary 330, and thereby may be associated with a node 331 and a node 332.

The ray $R_i$ 210 may be associated with the node 322 since the ray $R_i$ 210 and a right area R, located on a right side based on the boundary 320, collide.

Similarly, each of the four divided areas may be divided by a boundary 340, a boundary 350, a boundary 360, and a boundary 370. Accordingly, the 3D model 200 may be divided into the eight areas. Also, each of the eight areas may be associated with a node 341, a node 342, a node 351, a node 352, a node 361, a node 362, a node 371, and a node 372.

The ray $R_i$ 210 may be associated with the node 351 since the ray $R_i$ 210 and a left area L, located on a left side based on the boundary 350, collide.

Figure 4:
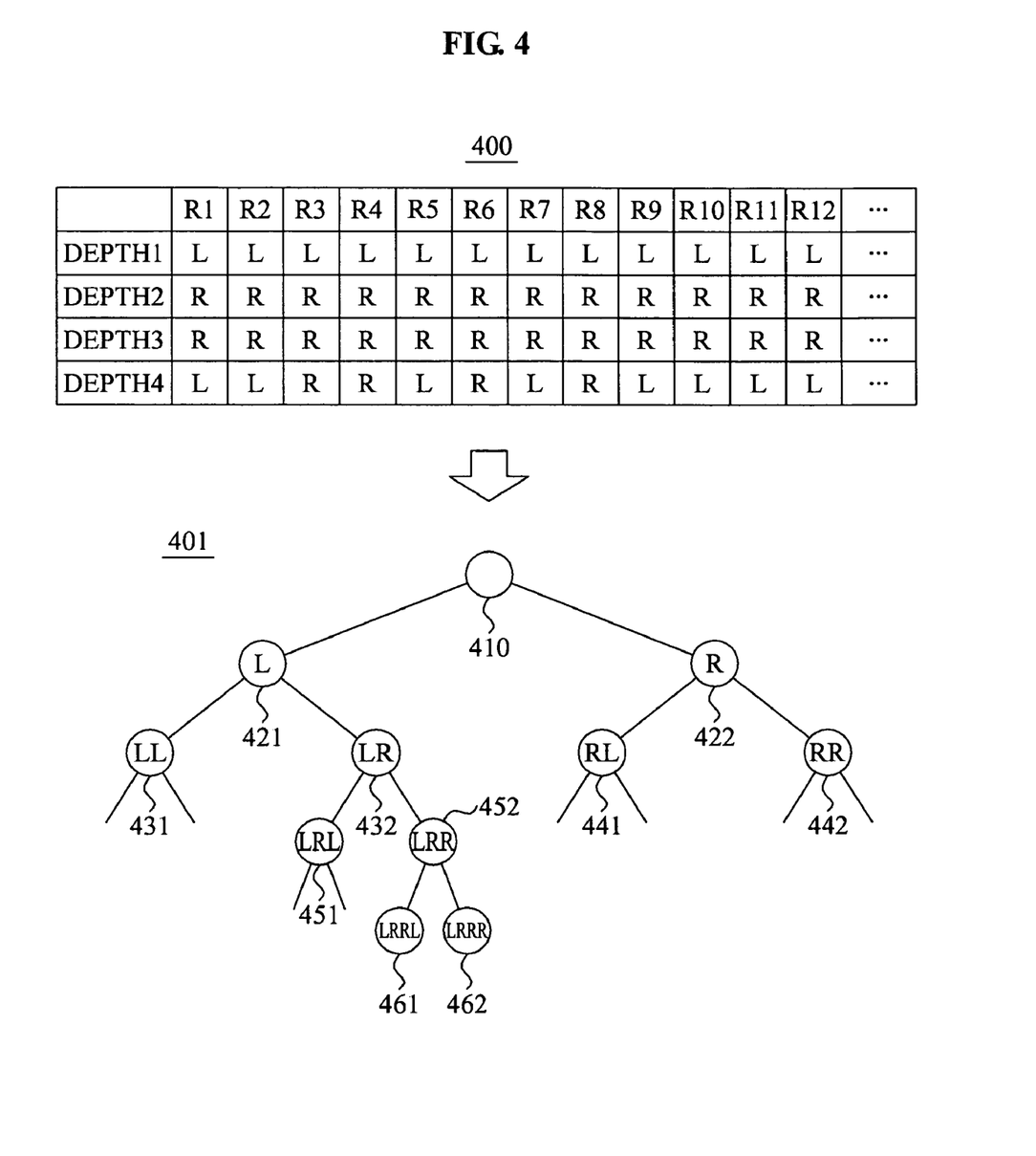
FIG. 4 illustrates an operation of generating a plurality of packets with respect to a plurality of rays in a data processing method according to example embodiments.

FIG. 4 illustrates an operation of generating a plurality of packets with respect to a plurality of rays in a data processing method according to example embodiments. A spatial data structure 401 may be generated by dividing a 3D space as described above with reference to FIG. 3.

When dividing a 3D space associated with a node 410 into two areas, a left area L may correspond to a node 421 which is a child node of the node 410. Also, a right area R may correspond to a node 422 which is a child node of the node 410.

According to example embodiments, a ray R1, a ray R2, a ray R3, a ray R4, a ray R5, a ray R6, a ray R7, a ray R8, a ray R9, a ray R10, a ray R11, and a ray R12 may be data processed. The rays R1 through R12 may be currently associated with a node 452. Specifically, all the rays R1 through R12 may be associated with the node 421 from among the child nodes of the node 410, that is, the node 421 and the node 422. Also, the rays R1 through R12 may be associated with a node 432 from among child nodes of the node 421, and be associated with the node 452 from among child nodes of the node 432.

That is, the rays R1 through R12 may be associated with a left area L in a depth 1, a right area R in a depth 2, and a right area R in a depth 3 in the spatial data structure 401.

A data processing apparatus according to example embodiments may determine which one of a node 461 and a node 462 is associated with the rays R1 through R12 in a depth 4. In this instance, the node 461 and the node 462 are child nodes of the node 452.

According to example embodiments, the rays R1 through R12 may be grouped into three packets by a control unit 110 of FIG. 1. For example, the rays R1 through R4 may be grouped into a packet, the rays R5 through R8 may be grouped into another packet, and the rays R9 through R12 may be grouped into still another packet different from the other two packets.

Also, the three packets may be sequentially provided to a processor 130, and the processor 130 may simultaneously determine whether the four rays are associated with a left area L or a right area R.

It is illustrated that a result of the determining which one of the node 461 and the node 462 is associated with each of the rays R1 through R12, associated with the node 452 in a row in the depth 4 of a table 400, through the data processing apparatus according to example embodiments.

In the depth 4 of the table 400, the ray R1, the ray R2, the ray R5, the ray R7, the ray R9, the ray R10, the ray R11, and the ray R12, designated as 'L', may be associated with the node 461, and the ray R3, the ray R4, the ray R6, and the ray R8, designated as 'R', may be associated with the node 462.

Also, according to example embodiments, a collision check may be performed according to a breadth-first search algorithm. For example, the data processing method may be applied to a plurality of rays associated with the node 410, and a portion of the plurality of rays may be associated with the node 421 and remaining rays of the plurality of rays may be associated with the node 422. That is, the data processing method may be applied to the portion of the plurality of rays, and also be applied to the remaining rays of the plurality of rays. Then, the data processing method may be applied to the node 431, the node 432, the node 441, and the node 442. That is, after the data processing method is applied to nodes in a same tree depth, the data processing method may be applied to nodes in a subsequent tree depth.

According to other example embodiments, however, the collision check may be performed based on a depth-first search algorithm. For example, after the data processing method is applied to the node 410, the data processing method may be applied to the node 421, and to the node 431. That is, the data processing method may be applied only towards a child node until a leaf node is reached.

Figure 5:
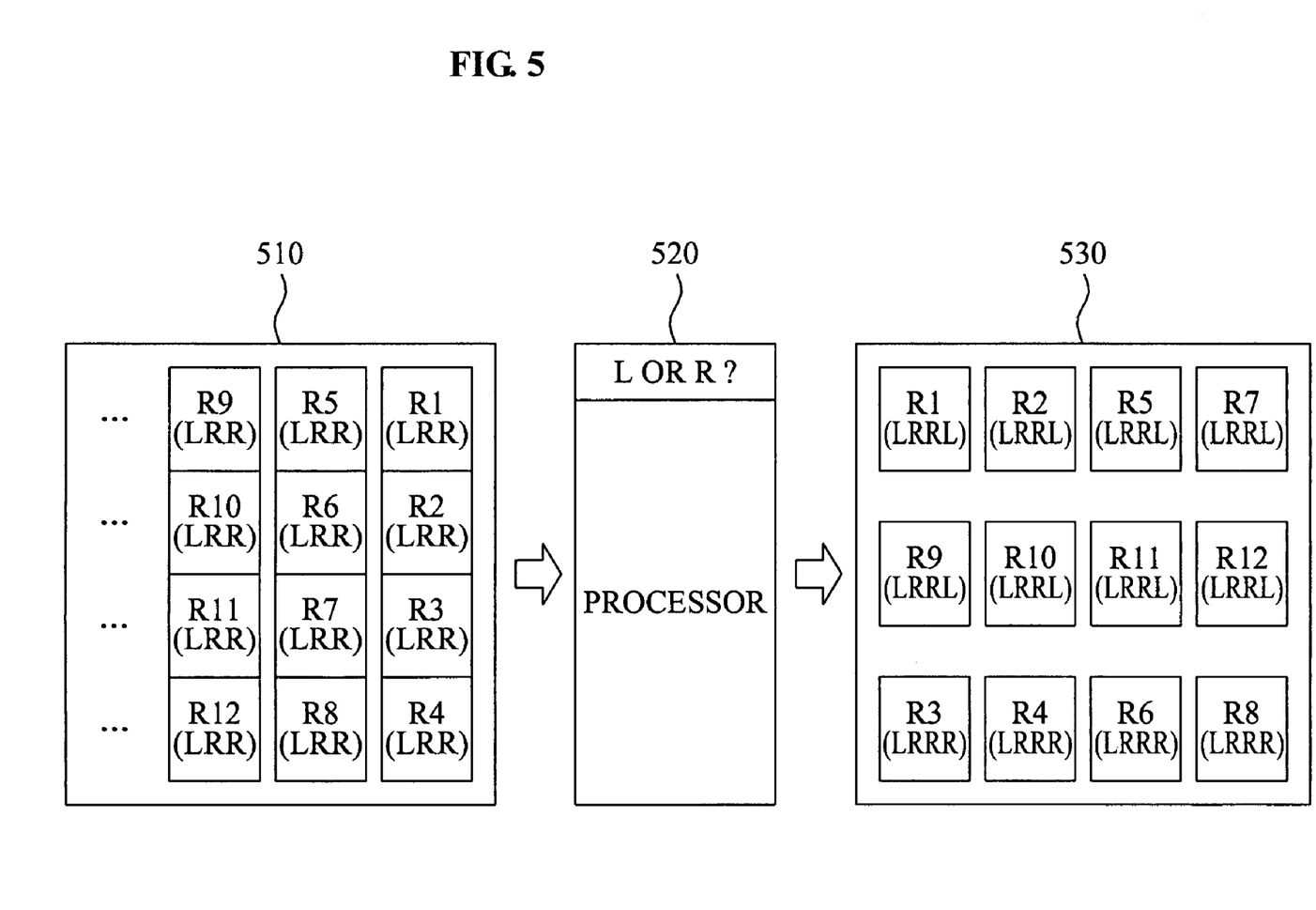
FIG. 5 illustrates an operation of processing a plurality of packets in a processor of a data processing apparatus according to example embodiments.

FIG. 5 illustrates an operation of processing a plurality of packets in a processor of a data processing apparatus according to example embodiments.

According to example embodiments, three packets are stored in a first buffer memory 510. The three packets may be generated by grouping a plurality of rays, for example, rays R1 through R12, into four rays per packet. In this instance, the plurality of rays is received in a control unit 110 of FIG. 1.

The three packets stored in the first buffer memory 510 may be currently associated with a same node, for example, a node 452 of FIG. 4. Accordingly, a tree traversal performed up to a current point in time may be identical. When the three packets are associated with the node 452 (FIG. 4), a tree traversal performed up to a current point in time with respect to the rays R1 through R12 may be 'LRR'. Accordingly, a control unit 110 (FIG. 1) may arbitrarily group currently received ray data, that is, the rays R1 through R12, into four rays per group, and thus three packets, one for each group, may be generated.

Although a form of a packet and a number of rays for each packet are illustrated in FIG. 5, the form of the packet and the number of rays for each packet may not be limited to the embodiments. As described above, when the number of rays for each packet is k, k may vary depending on hardware characteristics. In this instance, k may be a natural number, and the hardware characteristics may indicate how much data may be simultaneously processed by a processor 520.

According to example embodiments, the processor 520 may be a 128 bit processor, and have a four-wide characteristic. Four pieces of data may be simultaneously processed in parallel through the four-wide characteristic. Accordingly, a same instruction may be processed with respect to the four pieces of data.

When the processor 520 determines a child node, that is, a node 462 (FIG. 4) or a node 461 (FIG. 4), with respect to the three packets, the rays R1 through R12 may be stored in a second buffer memory 530.

According to other example embodiments, the ray R1, the ray R2, the ray R5, the ray R7, the ray R9, the ray R10, the ray R11, and the ray R12, which have a characteristic of 'LRRL', and the ray R3, the ray R4, the ray R6, and the ray R8, which have a characteristic of 'LRRR' may be stored in different memories.

Figure 6:
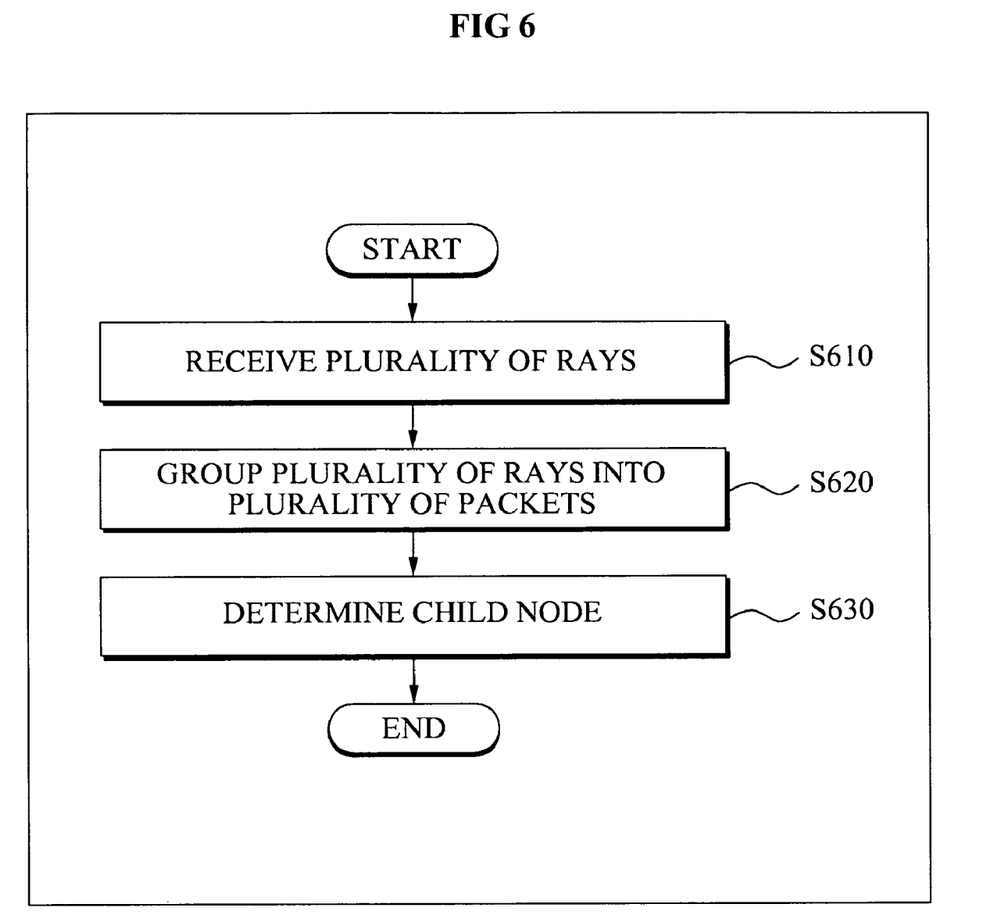
FIG. 6 illustrates a data processing method according to example embodiments.

FIG. 6 is a flowchart illustrating a data processing method according to example embodiments.

In operation S610, a plurality of rays may be received. The plurality of rays may be currently associated with a same node, and a tree traversal performed up to a current point in time may be identical with respect to the plurality of rays. For example, the plurality of rays may be rays R1 through R12 of FIG. 4.

In operation S620, the plurality of rays may be grouped into a plurality of packets. In this instance, a single packet may include k rays, and k may be a natural number. The value k may be determined according to hardware characteristics of a processor. For example, k may be determined as four in a 128 bit processor having a four-wide characteristic, from among SIMD-type processors.

According to example embodiments, the plurality of generated packets may be stored in a first buffer memory.

In operation S630, the plurality of packets may be sequentially provided to the processor, and the processor may determine a child node of the k rays included in each of the plurality of packets.

According to example embodiments, when the child node is determined in operation S630, each of the plurality of rays may be stored in a memory associated with a child node of a currently associated node. Also, the data processing method may be continuously repeated in the child node with respect to other rays.

In addition to the above described embodiments, embodiments can also be implemented through computer readable code/instructions in/on a medium, e.g., a computer readable medium, to control at least one processing device to implement any above described embodiment. The medium can correspond to any medium/media permitting the storing and/or transmission of the computer readable code.

The computer readable code can be recorded on a medium in a variety of ways, with examples of recording media including magnetic storage media (e.g., ROM, floppy disks, hard disks, etc.) and optical recording media (e.g., CD-ROMs, or DVDs). The computer readable code may also be transferred through transmission media as well as elements of the Internet, for example. Thus, the medium may be such a defined and measurable structure carrying or controlling a signal or information, such as a device carrying a bitstream, for example, according to embodiments of the present invention. The media may also be a distributed network, so that the computer readable code is stored/transferred and executed in a distributed fashion. Still further, as only an example, the processing device could include a processor or a computer processor, and processing elements may be distributed and/or included in a single device.

Examples of computer readable code include both machine code, such as produced by a compiler, and files containing higher level code that may be executed by the computer using an interpreter.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A data processing apparatus for a collision check with respect to a plurality of rays, the data processing apparatus comprising:
   a control unit to generate a plurality of packets with respect to a plurality of rays associated with a first node in a spatial data structure, the plurality of rays being grouped into the generated packets, such that plural rays are grouped into each generated packet; and
   a processor to sequentially receive the plurality of packets and simultaneously determine which child node of the first node is associated with each of the plural rays, grouped in the received packet, associated with the first node.

2. The data processing apparatus of claim 1, wherein the processor is a Single Instruction Multiple Data (SIMD)-type processor.

3. The data processing apparatus of claim 1, wherein upon simultaneously determining which child node of the first node is associated with each of the plurality rays, grouped in the received packet, associated with the first node, the processor determines which child node of a second node is associated with each of a plurality of rays associated with the second node according to a breadth-first search algorithm, the second node having a same depth as the first node in the spatial data structure.

4. The data processing apparatus of claim 1, wherein upon simultaneously determining which child node of the first node is associated with each of the plurality rays, grouped in the received packet, associated with the first node, the processor determines which grandchild node of the first node is associated with each of a plurality of rays associated with a first child node of the first node according to a depth-first search algorithm.

5. The data processing apparatus of claim 1, wherein the spatial data structure is a kd-tree, and a number of the child nodes of the first node is two.

6. The data processing apparatus of claim 1, wherein the spatial data structure is a Bounding Volume Hierarchies (BVH), and a number of the child nodes of the first node is two.

7. The data processing apparatus of claim 1, wherein the processor is a 128 bit processor, and at least one of the plurality of packets includes information regarding four of the rays.

8. The data processing apparatus of claim 7, wherein the spatial data structure is any one of a kd-tree and BVH.

9. A data processing apparatus for a collision check with respect to a plurality of rays, the data processing apparatus comprising:
   a control unit to generate a plurality of packets with respect to a plurality of rays associated with a first node in a spatial data structure, the plurality of rays being grouped into the generated packets, such that plural rays are grouped into each generated packet;

a first buffer memory to temporarily store the plurality of packets provided from the control unit; and a processor to sequentially receive the plurality of packets from the first buffer memory and simultaneously determine which child node of the first node is associated with the plurality rays, grouped in the received packet, associated with the first node.

10. The data processing apparatus of claim 9, further comprising:

a second buffer memory to store ray data including information about which child node of the first node is associated with the plurality of rays associated with the first node.

11. The data processing apparatus of claim 9, wherein the processor sequentially receives the plurality of packets from the first buffer memory and determines which child node of the first node is associated with a number of rays of the plurality of rays associated with the first node at every operation based on an SIMD operation.

12. A data processing method for a collision check with respect to a plurality of rays, the data processing method comprising:

generating a plurality of packets with respect to a plurality of rays associated with a first node in a spatial data structure, the plurality of rays being grouped into the generated packets, such that plural rays are grouped into each generated packet; and providing the plurality of packets sequentially to a processor and simultaneously determining which child node of the first node is associated with each of the plurality rays, grouped in the provided packet, associated with the first node.

13. The data processing method of claim 12, wherein the processor performs an SIMD operation.

14. The data processing method of claim 12, wherein, after simultaneously determining which child node of the first node is associated with each of the plurality rays, grouped in the provided packet, associated with the first node in the spatial data structure, the data processing method determines which child node of a second node is associated with each of a plurality of rays associated with the second node according to a breadth-first search algorithm, the second node having a same depth as the first node in the spatial data structure.

15. The data processing method of claim 12, wherein, after simultaneously determining which child node of the first node is associated with each of the plurality rays, grouped in the provided packet, associated with the first node in the spatial data structure, the data processing method determines which grandchild node of the first node is associated with each of a plurality of rays associated with a first child node of the first node according to a depth-first search algorithm.

16. The data processing method of claim 12, wherein the spatial data structure is a kd-tree, and a number of the child nodes of the first node is two.

17. The data processing method of claim 12, wherein the spatial data structure is a BVH, and a number of the child nodes of the first node is two.

18. The data processing method of claim 12, wherein the processor is a 128 bit processor, and at least one of the plurality of packets includes information regarding four of the rays.

19. A data processing method for a collision check with respect to a plurality of rays, the data processing method comprising:

generating a plurality of packets with respect to a plurality of rays associated with a first node in a spatial data structure and storing the plurality of packets in a first buffer memory, the plurality of rays being grouped into the generated packets, such that plural rays are grouped into each generated packet;

extracting the plurality of packets from the first buffer memory and sequentially providing the plurality of packets to an SIMD-type processor to simultaneously determine which child node of the first node is associated with the plurality rays, grouped in the extracted packet, associated with the first node; and storing ray data in a second buffer memory, the ray data including information provided from the SIMD-type processor.

20. A computer-readable recording medium having stored thereon instructions causing a processor to implement a data processing method for a collision check with respect to a plurality of rays, the instructions comprising:

generating a plurality of packets with respect to a plurality of rays associated with a first node in a spatial data structure, the plurality of rays being grouped into the generated packets, such that plural rays are grouped into each generated packet;

providing the plurality of packets sequentially to a processor and simultaneously determining which child node of the first node is associated with the plurality rays, grouped in the provided packet, associated with the first node.

* * * * *

UNITED STATES PATENT AND TRADEMARK OFFICE
CERTIFICATE OF CORRECTION

Page 1 of 1

PATENT NO.       : 8,253,738 B2
APPLICATION NO.  : 12/382750
DATED            : August 28, 2012
INVENTOR(S)      : In Woo Ha It is certified that error appears in the above-identified patent and that said Letters Patent is hereby corrected as shown below:

Column 8, Line 32, In Claim 3, delete "plurality" and insert -- plural --, therefor.
Column 8, Line 41, In Claim 4, delete "plurality" and insert -- plural --, therefor.
Column 9, Line 6, In Claim 9, delete "plurality" and insert -- plural --, therefor.
Column 9, Line 30 (Approx.), In Claim 12, delete "plurality" and insert -- plural --, therefor.
Column 9, Line 37 (Approx.), In Claim 14, delete "plurality" and insert -- plural --, therefor.
Column 9, Line 46 (Approx.), In Claim 15, delete "plurality" and insert -- plural --, therefor.
Column 10, Line 28, In Claim 19, delete "plurality" and insert -- plural --, therefor.
Column 10, Line 44, In Claim 20, delete "plurality" and insert -- plural --, therefor.

Signed and Sealed this
Twentieth Day of November, 2012

David J. Kappos
*Director of the United States Patent and Trademark Office*